(12) United States Patent
Inoue

(10) Patent No.: US 12,155,772 B2
(45) Date of Patent: Nov. 26, 2024

(54) OPERATION DEVICE FOR EXECUTING HASH FUNCTIONS HAVING DIFFERENT INPUT DATA WIDTHS

(71) Applicant: KIOXIA CORPORATION, Tokyo (JP)

(72) Inventor: Kazuki Inoue, Kanagawa (JP)

(73) Assignee: Kioxia Corporation, Tokyo (JP)

(*) Notice: Subject to any disclaimer, the term of this patent is extended or adjusted under 35 U.S.C. 154(b) by 392 days.

(21) Appl. No.: 17/458,163

(22) Filed: Aug. 26, 2021

(65) Prior Publication Data
US 2022/0303140 A1 Sep. 22, 2022

(30) Foreign Application Priority Data

Mar. 22, 2021 (JP) ................................. 2021-047658

(51) Int. Cl.
*H04L 9/32* (2006.01)
(52) U.S. Cl.
CPC .......... *H04L 9/3242* (2013.01); *H04L 9/3247* (2013.01)
(58) Field of Classification Search
CPC ... H04L 9/3242; H04L 9/3247; H04L 9/0643; G09C 1/00
See application file for complete search history.

(56) References Cited

U.S. PATENT DOCUMENTS

| | | | | |
|---|---|---|---|---|
| 6,829,335 B2* | 12/2004 | Colemon | ............ | H04M 3/493 379/207.14 |
| 11,303,429 B2* | 4/2022 | Ghosh | ................. | H04L 9/3247 |
| 2018/0183577 A1* | 6/2018 | Suresh | .................. | H04L 9/0643 |
| 2019/0042765 A1 | 2/2019 | Chung et al. | | |
| 2019/0319782 A1* | 10/2019 | Ghosh | .................. | H04L 9/3239 |
| 2019/0379547 A1* | 12/2019 | Durham | .................. | H04L 69/04 |
| 2020/0349866 A1 | 11/2020 | Ghosh et al. | | |
| 2020/0403802 A1* | 12/2020 | Hars | ..................... | H04L 9/3242 |

FOREIGN PATENT DOCUMENTS

JP 2011-133916 A 7/2011

OTHER PUBLICATIONS

"FIPS PUB 180-4 Federal Information Processing Standards Publication: Secure Hash Standard (SHS)" (pp. 1-31) https://nvlpubs.nist.gov/nistpubs/FIPS/NIST.FIPS.180-4.pdf (Year: 2015).*

(Continued)

*Primary Examiner* — Joseph P Hirl
*Assistant Examiner* — Thomas A Gyorfi
(74) *Attorney, Agent, or Firm* — Kim & Stewart LLP

(57) ABSTRACT

An operation device for executing a first hash function and a second hash function having a larger input data width than that of the first hash function, includes a first conversion circuit configured to, upon receipt of a selection signal indicating the first hash function, convert input data according to the input data width of the second hash function, a hash operation circuit configured to perform, based on the selection signal, either the first hash function or the second hash function on the input data and generate output data, a second conversion circuit configured to, when the selection signal indicates the first hash function, convert the output data according to an output data width of the first hash function, and an output buffer that stores the output data.

18 Claims, 16 Drawing Sheets

(56) References Cited

OTHER PUBLICATIONS

Wikipedia article for "SHA-2", dated Dec. 20, 2017 (8 pages) https://en.wikipedia.org/w/index.php?title=SHA-2&oldid=816269108 (Year: 2017).*

L. Dadda, M. Macchetti and J. Owen, "The design of a high speed ASIC unit for the hash function SHA-256 (384, 512)," (6 pages) (Year: 2004).*

* cited by examiner

FIG. 6

| | HASH SIZE (OUTPUT DATA WIDTH) | BLOCK SIZE (INPUT DATA WIDTH) | REGISTER SIZE (OPERATION WIDTH) | NUMBER OF ROUNDS | OPERATION |
|---|---|---|---|---|---|
| SHA256 | 256bit | 512bit | 32bit | 64 | INITIAL VALUE, CONSTANT $K_i$, AND PROCESSING OF LOGICAL OPERATION $\Sigma$ ARE DIFFERENT |
| SHA512 | 512bit | 1024bit | 64bit | 80 | |

OPERATION DEVICE FOR EXECUTING HASH FUNCTIONS HAVING DIFFERENT INPUT DATA WIDTHS

CROSS-REFERENCE TO RELATED APPLICATION

This application is based upon and claims the benefit of priority from Japanese Patent Application No. 2021-047658, filed Mar. 22, 2021, the entire contents of which are incorporated herein by reference.

FIELD

Embodiments described herein relate generally to an operation device, a method for executing a hash function, and a memory system.

BACKGROUND

In the related art, a hash function has been used in digital signature processing.

BRIEF DESCRIPTION OF THE DRAWINGS

FIG. 6 depicts aspects related to SHA-256 and SHA-512.

DETAILED DESCRIPTION

Embodiments provide an operation device for improving computer systems and the like by including a hash function circuit of a smaller circuit size for executing a plurality of hash functions.

In general, according to one embodiment, an operation device for executing a first hash function and a second hash function having a larger input data width than that of the first hash function, includes a first conversion circuit configured to, upon receipt of a selection signal indicating the first hash function, convert input data according to the input data width of the second hash function. The operation device further includes a hash operation circuit configured to perform, based on the selection signal, either the first hash function or the second hash function on the input data and generate output data. The operation device further includes a second conversion circuit configured to, when the selection signal indicates the first hash function, convert the output data according to an output data width of the first hash function. The operation device further includes an output buffer that stores the output data.

In the following, memory systems according to certain example embodiments will be described as examples of an operation device incorporating a hash function circuit. It is noted that the disclosure is applicable not only memory systems but any other systems incorporating or including a hash function circuit or the functions thereof. This disclosure may be applied to any system or device including a memory for storing a computer program and a processor for executing the computer program. Such memory systems will be described with reference to the accompanying drawings. It is noted that the present disclosure is not limited to the particular example embodiments described below.

First Embodiment

Figure 1:
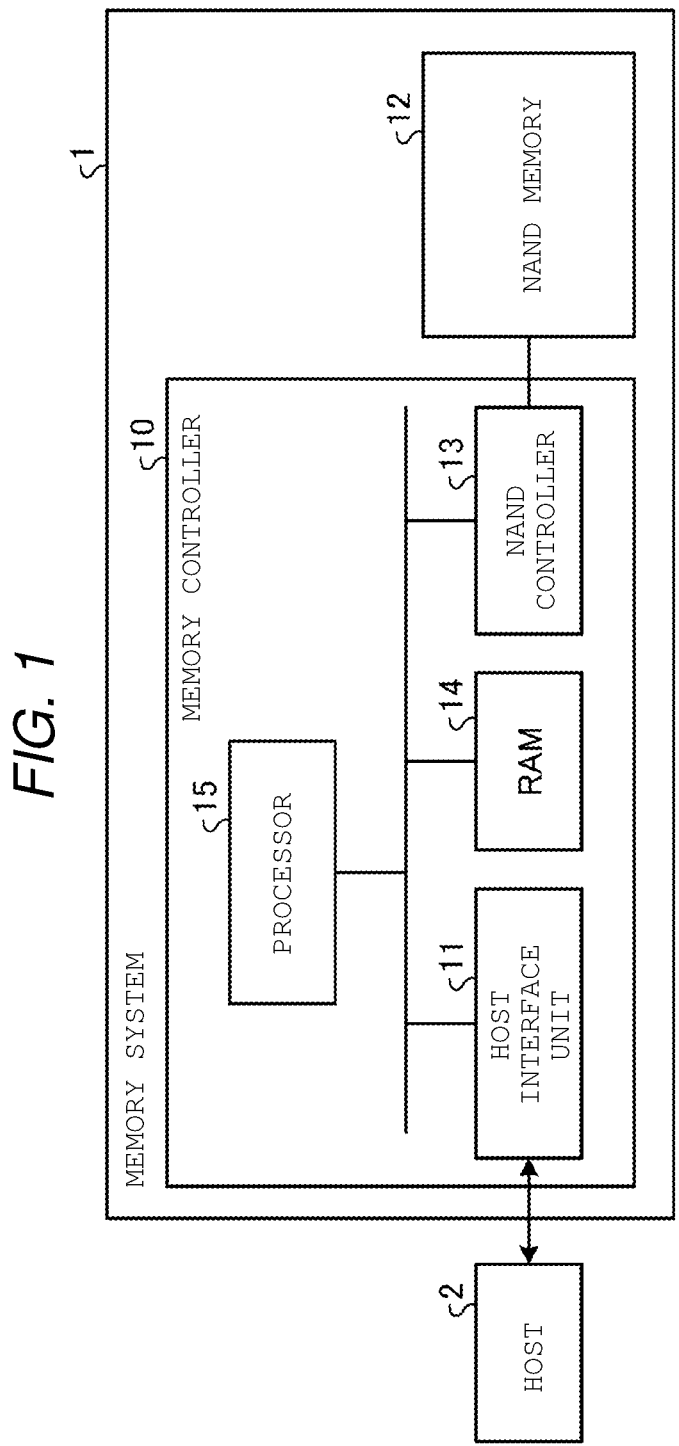
FIG. 1 is a block diagram of a memory system according to a first embodiment.

FIG. 1 is a block diagram of a memory system 1 according to a first embodiment. The memory system 1 is, for example, a solid state drive (SSD). In the following, a case where a NAND flash memory (hereinafter referred to as NAND memory) is used as a non-volatile memory will be described as an example.

The memory system 1 is configured to be connectable to a host 2. For example, the host 2 is a central processing unit (CPU), a personal computer, a portable information device, a server, or the like. Any interface standard may be adopted as an interface standard for communication between the memory system 1 and the host 2. Two or more hosts 2 may be simultaneously connected to the memory system 1. The host 2 and the memory system 1 may be connected via a network.

The memory system 1 transmits and receive data to and from the host 2 in response to access commands issued by the host 2.

The memory system 1 includes a NAND memory 12 and a memory controller 10. The memory controller 10 includes, for example, a host interface unit 11, a NAND controller 13, a random access memory (RAM) 14, and a processor 15. The memory controller 10 may include a plurality of processors 15.

The processor 15 controls the memory system 1 by executing one or more programs stored in the memory system 1. For example, the programs are stored in the NAND memory 12 and loaded into the RAM 14 at startup. The processor 15 executes the programs that have been loaded into the RAM 14. The control of the memory system 1 includes a plurality of pieces of processing executed by the processor 15. A part or all of the plurality of pieces of processing may be performed by one or more hardware circuits. Each piece of processing executed by the processor 15 will be described later.

The host interface unit 11 is an interface circuit for the memory system 1 to communicate with the host 2. For example, the host interface unit 11 transfers user data between the host 2 and the RAM 14 under the control of the processor 15.

The NAND controller 13 is an interface circuit for accessing the NAND memory 12. The NAND controller 13 transfers the user data or management information between the RAM 14 and the NAND memory 12 under the control of the processor 15. The NAND controller 13 can perform any known error correction processing.

The NAND memory 12 is a non-volatile storage medium. For example, the NAND memory 12 is a non-volatile semiconductor memory. The NAND memory 12 includes one or more memory chips.

The RAM 14 is a memory for temporarily storing data. The RAM 14 may be embedded in the memory controller 10 or may be installed outside the memory controller 10. As the RAM 14, for example, a type of memory faster than the NAND memory 12 may be adopted. As the RAM 14, for example, a volatile or non-volatile memory may be adopted. As the RAM 14, for example, a dynamic RAM (DRAM), static RAM (SRAM), ferroelectric RAM (FeRAM), magnetoresistive RAM (MRAM), phase change RAM (PRAM), and the like may be adopted.

Figure 2:
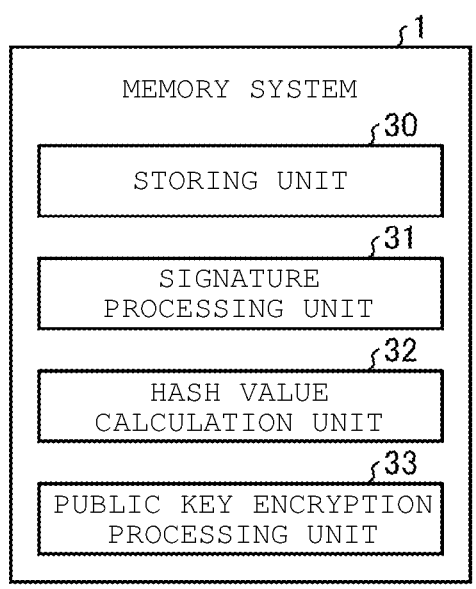
FIG. 2 is a functional block diagram of a memory system according to a first embodiment.

FIG. 2 is a functional block diagram of the memory system 1 according to the first embodiment. As illustrated in FIG. 2, the memory system 1 includes a storing unit 30, a signature processing unit 31, a hash value calculation unit 32, and a public key encryption processing unit 33.

The storing unit 30 stores various types of information. The storing unit 30 stores, for example, a private key, a public key, a message, and signature information. The storing unit 30 is implemented in the RAM 14 and/or the NAND memory 12.

The signature processing unit 31 performs signature processing. The signature processing unit 31 is implemented by the processor 15. The signature processing unit 31 generates a signature and verifies the signature based on a hash value.

The hash value calculation unit 32 is a circuit configured to calculate a hash value (hereinafter also referred to as "hash operation circuit". The hash value calculation unit 32 is in, for example, the memory controller 10.

The public key encryption processing unit 33 performs public key encryption processing. The public key encryption processing unit 33 is in, for example, the memory controller 10.

Hash Value Calculation Method by Operation Device According to Comparative Example Before particularly describing a hash value calculation unit 32, a hash value calculation procedure by an operation device according to a comparative example will be described with reference to FIG. 3.

Figure 3:
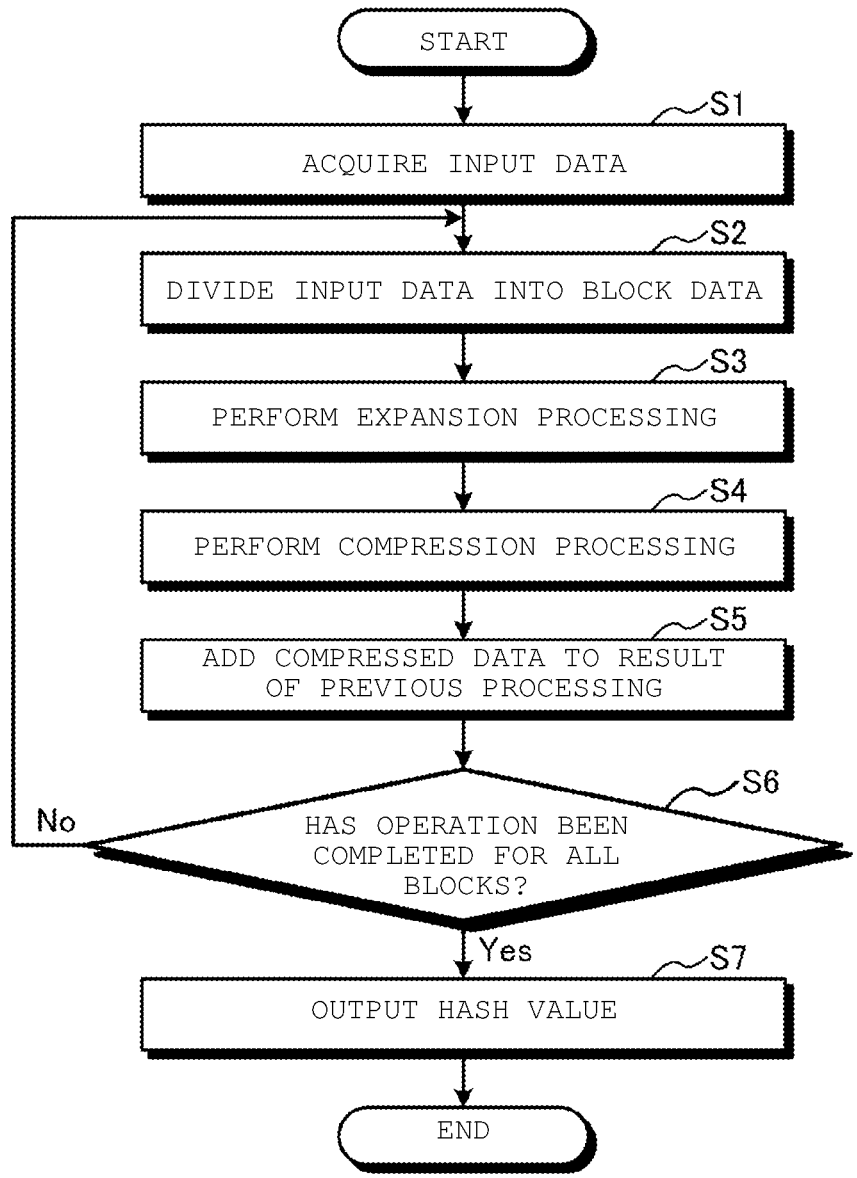
FIG. 3 is a flowchart of a hash value calculation procedure performed by an operation device according to a comparative example.

FIG. 3 is a flowchart of the hash value calculation procedure performed by the operation device according to the comparative example. First, the operation device acquires input data (step S1). The operation device divides the input data into blocks every 512 bits or 1024 bits (step S2). Subsequently, the operation device performs expansion processing for expanding data of the block (step S3). For example, when input data is 512 bits, the operation device sets the input data to 2048 bits.

Subsequently, the operation device performs compression processing for compressing the expanded data (step S4). For example, the operation device compresses the data expanded by the expansion processing to 2048 bits to data of 256 bits.

Subsequently, the operation device adds the compressed data to the result of previous processing (step S5). It is then determined whether the operation has been completed for all the blocks (step S6). When the operation has not been completed for all blocks (No in step S6), the procedure returns to step S2. When the operation has been completed for all blocks (Yes in step S6), the operation device outputs a hash value (step S7).

As described above, the operation device includes a circuit that executes the expansion processing and a circuit that executes the compression processing. Here, an example of the circuit that executes the expansion processing is illustrated in FIG. 4.

Figure 4:
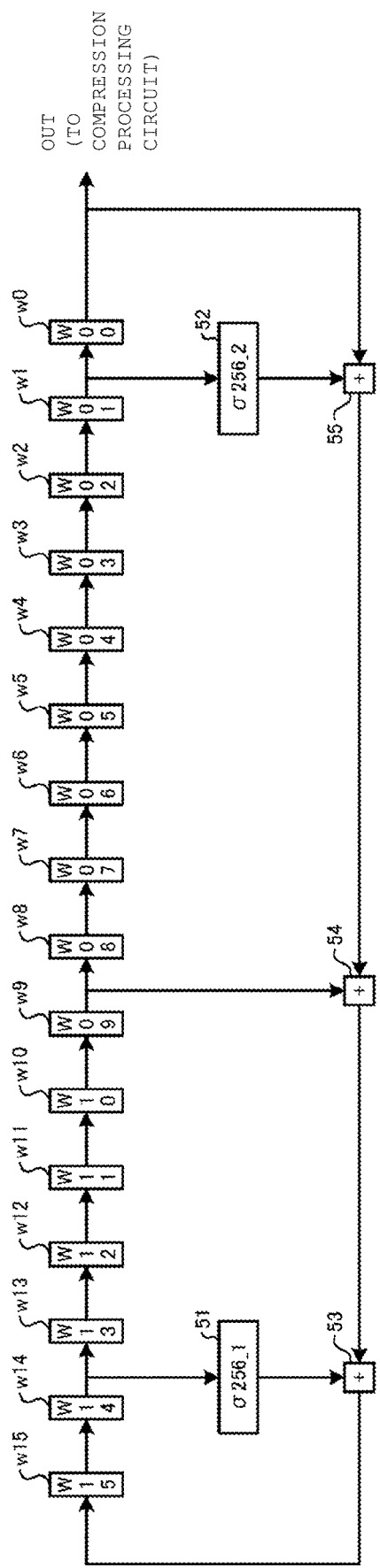
FIG. 4 is a diagram of an expansion processing circuit of the operation device according to the comparative example.

FIG. 4 is a circuit diagram of an expansion processing circuit of the operation device according to the comparative example for executing the expansion processing. As illustrated in FIG. 4, the expansion processing circuit includes registers w0 to w15, a logic function operation unit 51, a logic function operation unit 52, and addition operation units 53 to 55.

It is noted that processing performed by the logic function operation unit 51 and the logic function operation unit 52 is different depending on a type of hash function. That is, the processing performed by the logic function operation unit is different depending on whether the hash function of SHA-256 is executed or the hash function of SHA-512 is executed.

Figure 5:
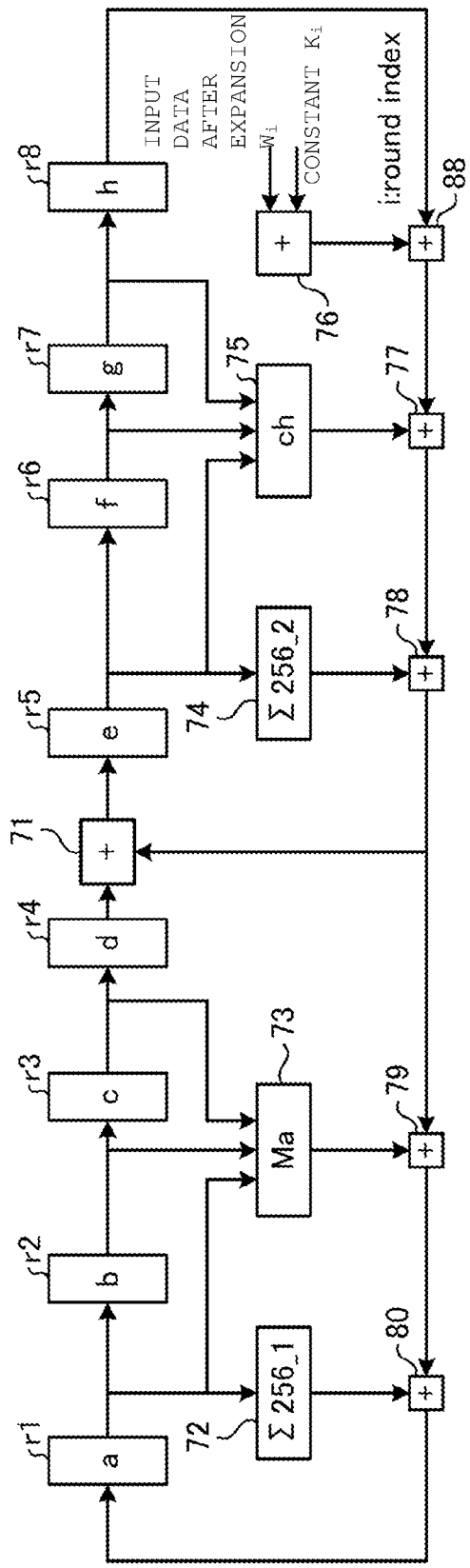
FIG. 5 is a diagram of a compression processing circuit of the operation device according to the comparative example.

An example of a circuit that executes compression processing is illustrated in FIG. 5. FIG. 5 is a circuit diagram of a compression processing circuit of the operation device according to the comparative example for executing the compression processing. As illustrated in FIG. 5, the compression processing circuit includes registers r0 to r8, an addition operation unit 71, a logic function operation unit 72, a logic function operation unit 73, a logic function operation unit 74, a logic function operation unit 75, addition operation units 76 to 80, and an addition operation unit 88.

It is noted that the processing performed by the logic function operation unit 72 and the logic function operation unit 74 is different depending on the type of hash function. That is, the processing performed by the logic function operation unit is different depending on whether the hash function of SHA-256 is executed or the hash function of SHA-512 is executed.

Here, execution contents in the case of SHA-256 in the logic function operation unit 72 are illustrated by the following expression 1:

$$\Sigma_0(a)=(a>>>2)\oplus(a>>>13)\oplus(a>>>22) \quad (1)$$

Here, ">>>" indicates a right shift operation, and "⊕" indicates an XOR operation. The execution contents in the logic function operation unit 73 are illustrated in the following expression 2:

$$Ma(a,b,c)=(a\wedge b)\oplus(a\wedge c)\oplus(b\wedge c) \quad (2)$$

Here, "∧" indicates an AND operation. The processing performed by the logic function operation unit 74 is illustrated by the following expression 3:

$$\Sigma_1(e)=(e>>>6)\oplus(e>>>11)\oplus(e>>>25) \quad (3)$$

Here, the processing performed by the logic function operation unit 75 in the case of SHA-256 is illustrated by the following expression 4:

$$Ch(e,f,g)=(e\wedge f)\oplus(\neg e\wedge g) \quad (4)$$

Here, "¬" indicates a NOT operation. In the compression processing circuit, compression processing is executed with input data after expansion and a constant being input to the addition operation unit 76 as a trigger.

In this example, it is examined to execute the hash function of SHA-256 and the hash function of SHA-512. FIG. 6 depicts the differences between SHA-256 and SHA-512.

As illustrated in FIG. 6, SHA-256 has a smaller output data width, input data width, operation width, and the number of rounds than those of SHA-512. The SHA-512 has a larger input data width and output data width than those of SHA-256, and thus the security level is high. Considering usability and safety, it is desirable for operation devices to support both SHA-256 and SHA-512.

If the circuit that executes the hash function of SHA-256 and the circuit that executes the hash function of SHA-512 are simply combined, its circuit size becomes large. Therefore, in the first embodiment, the memory system 1 that includes a hash function circuit having a smaller circuit size will be described.

Figure 7:
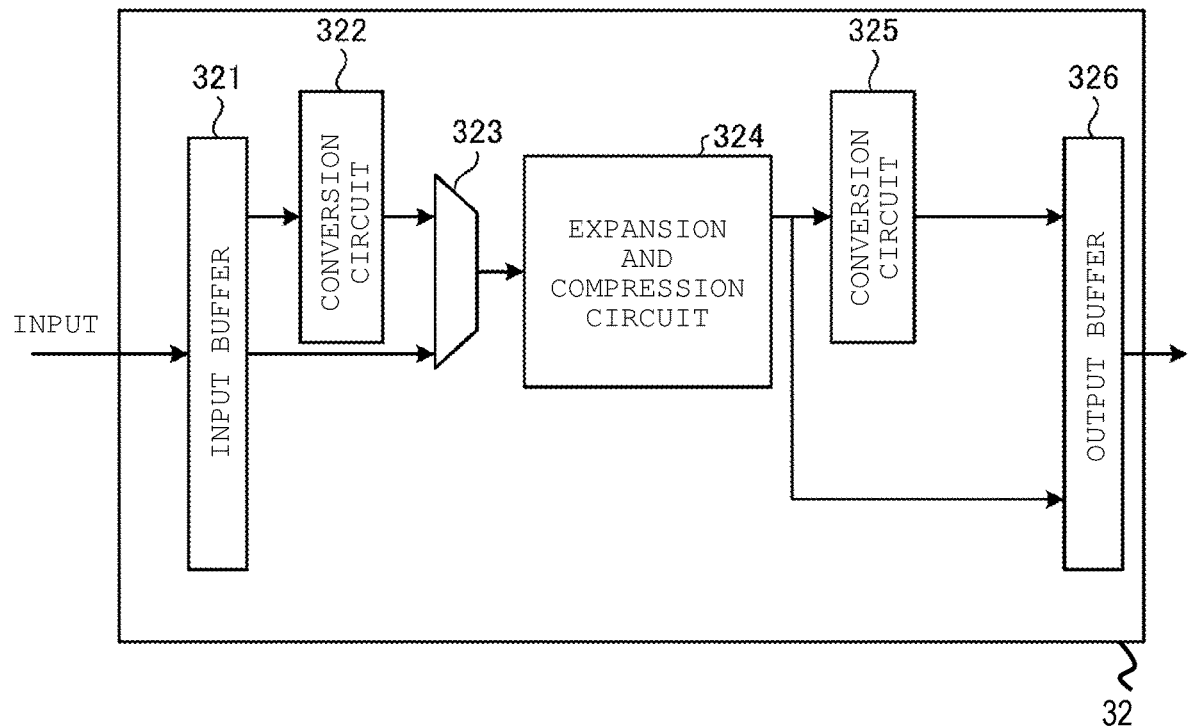
FIG. 7 is a circuit diagram of a hash value calculation unit according to a first embodiment.

First, a circuit illustrating the hash value calculation unit 32 will be described with reference to FIG. 7. FIG. 7 is a circuit diagram of the hash value calculation unit 32 according to the first embodiment. As illustrated in FIG. 7, the hash value calculation unit 32 includes an input buffer 321, a conversion circuit 322, a selector 323, an expansion and compression circuit 324, a conversion circuit 325, and an output buffer 326.

The input buffer 321 stores input data from the signature processing unit 31 (see FIG. 2). The input buffer 321 stores data corresponding to a selection signal indicating a hash function to be applied. It is noted that the selection signal is also output to the selector 323, the expansion and compression circuit 324, and the output buffer 326. The signature processing unit 31 may output the selection signal to the hash value calculation unit 32.

Block data obtained by dividing the input data based on the selection signal is output from the input buffer 321. For example, when the selection signal indicates that the hash function of SHA-256 is to be executed, the block data is output from the input buffer 321 to the conversion circuit 322. When the selection signal indicates that the hash function of SHA-512 is to be executed, block data is output from the input buffer 321 to the selector 323.

Figure 8:
FIG. 8 depicts a process of converting block data according to a first embodiment.

The conversion circuit 322 converts the block data acquired from the input buffer 321. FIG. 8 depicts a process of converting block data according to the first embodiment. The conversion circuit 322 acquires block data of 32-bit×16. The conversion circuit 322 converts the acquired block data to block data of 64-bit×16. Here, the conversion circuit 322 uses half of the 64-bit data as dummy data. For example, as illustrated in FIG. 8, in the block data of 64-bit×16, data of 32-bit×16 before conversion is arranged in the shaded area, and the dummy data is arranged in the white area.

The conversion circuit 322 outputs the converted block data to the selector 323. The selector 323 outputs the block data to the expansion and compression circuit 324 based on the selection signal. When the selection signal indicates that the hash function of SHA-256 is to be executed, the selector 323 outputs the block data output from the conversion circuit 322 to the expansion and compression circuit 324. When the selection signal indicates that the hash function of SHA-512 is to be executed, the selector 323 outputs the block data output from the input buffer 321 to the expansion and compression circuit 324.

Figure 9:
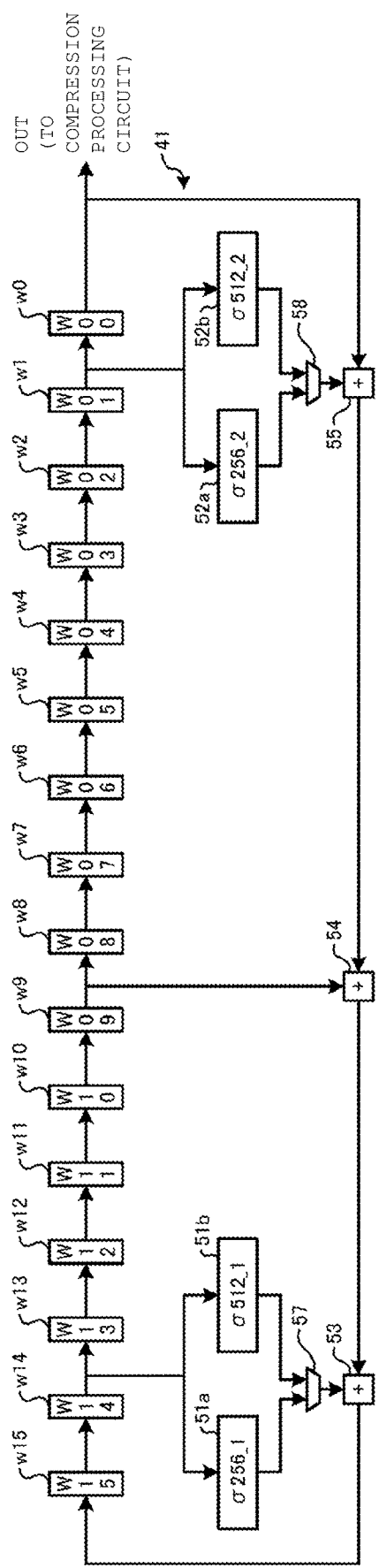
FIG. 9 is a diagram of an expansion processing circuit according to a first embodiment.

The expansion and compression circuit 324 is configured to perform expansion processing and compression processing. The expansion and compression circuit 324 has a register size of 64 bits. Here, an expansion processing circuit part of the expansion and compression circuit 324 is illustrated in FIG. 9. FIG. 9 is a circuit diagram of an expansion processing circuit according to this embodiment. As illustrated in FIG. 9, the expansion processing circuit 41 includes registers w0 to w15, a logic function operation unit 51a, a logic function operation unit 51b, a logic function operation unit 52a, a logic function operation unit 52b, addition operation units 53 to 55, a selector 57, and a selector 58.

The logic function operation unit 51a is an operation unit corresponding to SHA-256, and the logic function operation unit 51b is an operation unit corresponding to SHA-512. The logic function operation unit 51a and the logic function operation unit 51b output an operation result to the selector 57.

The logic function operation unit 52a is an operation unit corresponding to SHA-256 and the logic function operation unit 52b is an operation unit corresponding to SHA-512. The logic function operation unit 52a and the logic function operation unit 52b output the operation result to the selector 58.

When the selection signal indicates that the hash function of SHA-256 is to be executed, the selector 57 outputs the operation result output from the logic function operation unit 51a to the addition operation unit 53. When the selection signal indicates that the hash function of SHA-512 is to be executed, the selector 57 outputs the operation result output from the logic function operation unit 51b to the addition operation unit 53.

When the selection signal indicates that the hash function of SHA-256 is to be executed, the selector 58 outputs the operation result output from the logic function operation unit 52a to the addition operation unit 55. When the selection signal indicates that the hash function of SHA-512 is to be executed, the selector 58 outputs the operation result output from the logic function operation unit 52b to the addition operation unit 55.

As described above, the expansion processing circuit 41, which is a part of the expansion and compression circuit 324, can reduce the circuit area as compared with the case where a plurality of expansion processing circuits are provided by sharing the register part and the addition operation units and including only the logic function operation unit 51 and the logic function operation unit 52 whose processing contents are different between SHA-256 and SHA-512.

Figure 10:
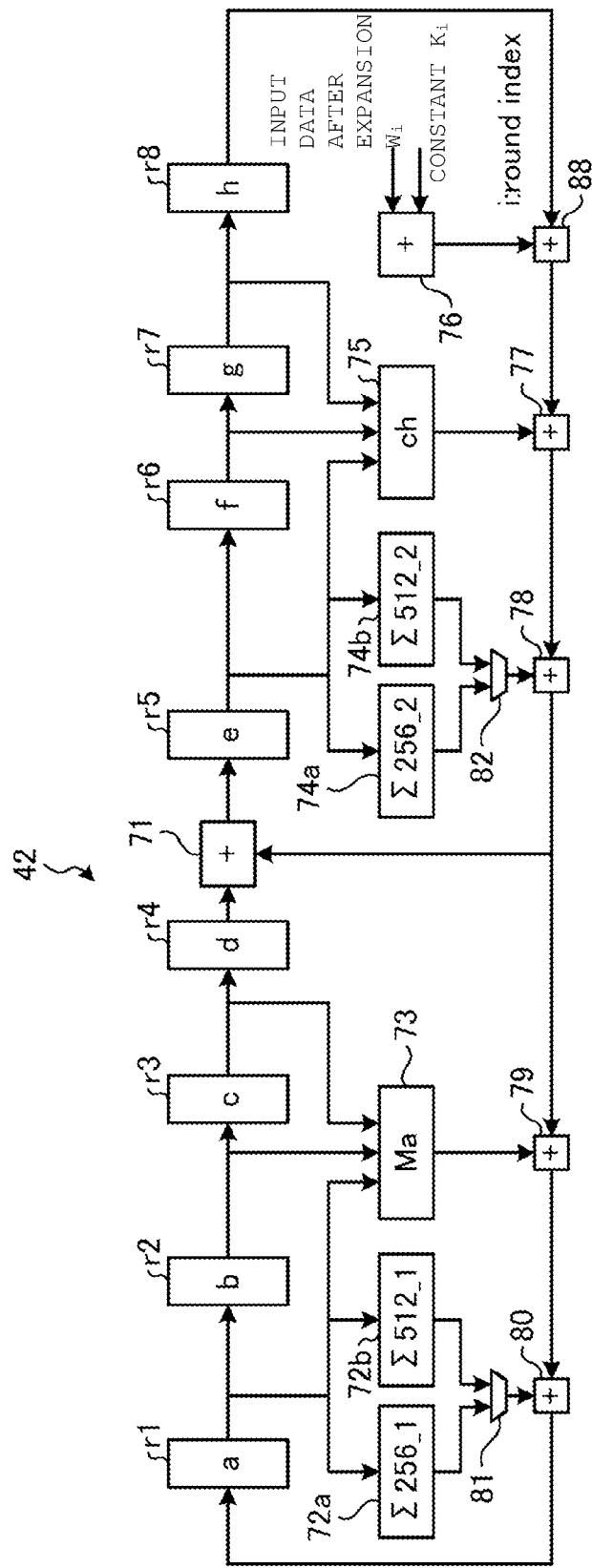
FIG. 10 is a diagram of a compression processing circuit according to a first embodiment.

The compression processing circuit part of the expansion and compression circuit 324 is illustrated in FIG. 10. FIG. 10 is a circuit diagram a compression processing circuit according to the first embodiment. As illustrated in FIG. 10, a compression processing circuit 42 includes registers r0 to r8, an addition operation unit 71, a logic function operation unit 72a, a logic function operation unit 72b, a logic function operation unit 73, a logic function operation unit 74a, a logic function operation unit 74b, a logic function operation unit 75, addition operation units 76 to 80, a selector 81, a selector 82, and an addition operation unit 88.

The logic function operation unit 72a is an operation unit corresponding to SHA-256, and the logic function operation unit 72b is an operation unit corresponding to SHA-512. The logic function operation unit 72a and the logic function operation unit 72b output an operation result to the selector 81.

The logic function operation unit 74a is an operation unit corresponding to SHA-256 and the logic function operation unit 74*b* is an operation unit corresponding to SHA-512. The logic function operation unit 74*a* and the logic function operation unit 74*b* output the operation result to the selector 82.

When the selection signal indicates that the hash function of SHA-256 is to be executed, the selector 81 outputs the operation result output from the logic function operation unit 72*a* to the addition operation unit 80. When the selection signal indicates that the hash function of SHA-512 is to be executed, the selector 81 outputs the operation result output from the logic function operation unit 72*b* to the addition operation unit 80.

When the selection signal indicates that the hash function of SHA-256 is to be executed, the selector 82 outputs the operation result output from the logic function operation unit 74*a* to the addition operation unit 78. When the selection signal indicates that the hash function of SHA-512 is to be executed, the selector 82 outputs the operation result output from the logic function operation unit 74*b* to the addition operation unit 78.

As described above, the compression processing circuit 42, which is a part of the expansion and compression circuit 324, can reduce the circuit area as compared with the case where a plurality of compression processing circuits are provided by sharing the register part and the addition operation units and including only the logic function operation unit 72 and the logic function operation unit 74 whose processing contents are different between SHA-256 and SHA-512.

Referring back to FIG. 7, when the selection signal indicates that the hash function of SHA-256 is to be executed, the expansion and compression circuit 324 outputs a value of 512 bits, which is a result of the operation, to the conversion circuit 325. When the selection signal indicates that the hash function of SHA-512 is to be executed, the expansion and compression circuit 324 outputs a value of 512 bits, which is a result of the operation, to the output buffer 326. The conversion circuit 325 converts block data of 512 bits into data of 32-bit×8. That is, the conversion circuit 325 extracts only a valid data portion on the assumption that the hash function of SHA-256 is executed. The conversion circuit 325 outputs the converted data of 32-bit×8 to the output buffer 326.

The output buffer 326 stores the hash value that is output from the conversion circuit 325 and the expansion and compression circuit 324. When the selection signal indicates that the hash function of SHA-256 is to be executed, the hash value acquired from the conversion circuit 325 is output to the signature processing unit 31. When the selection signal indicates that the hash function of SHA-512 is to be executed, the hash value acquired from the expansion and compression circuit 324 is output to the signature processing unit 31.

Figure 11:
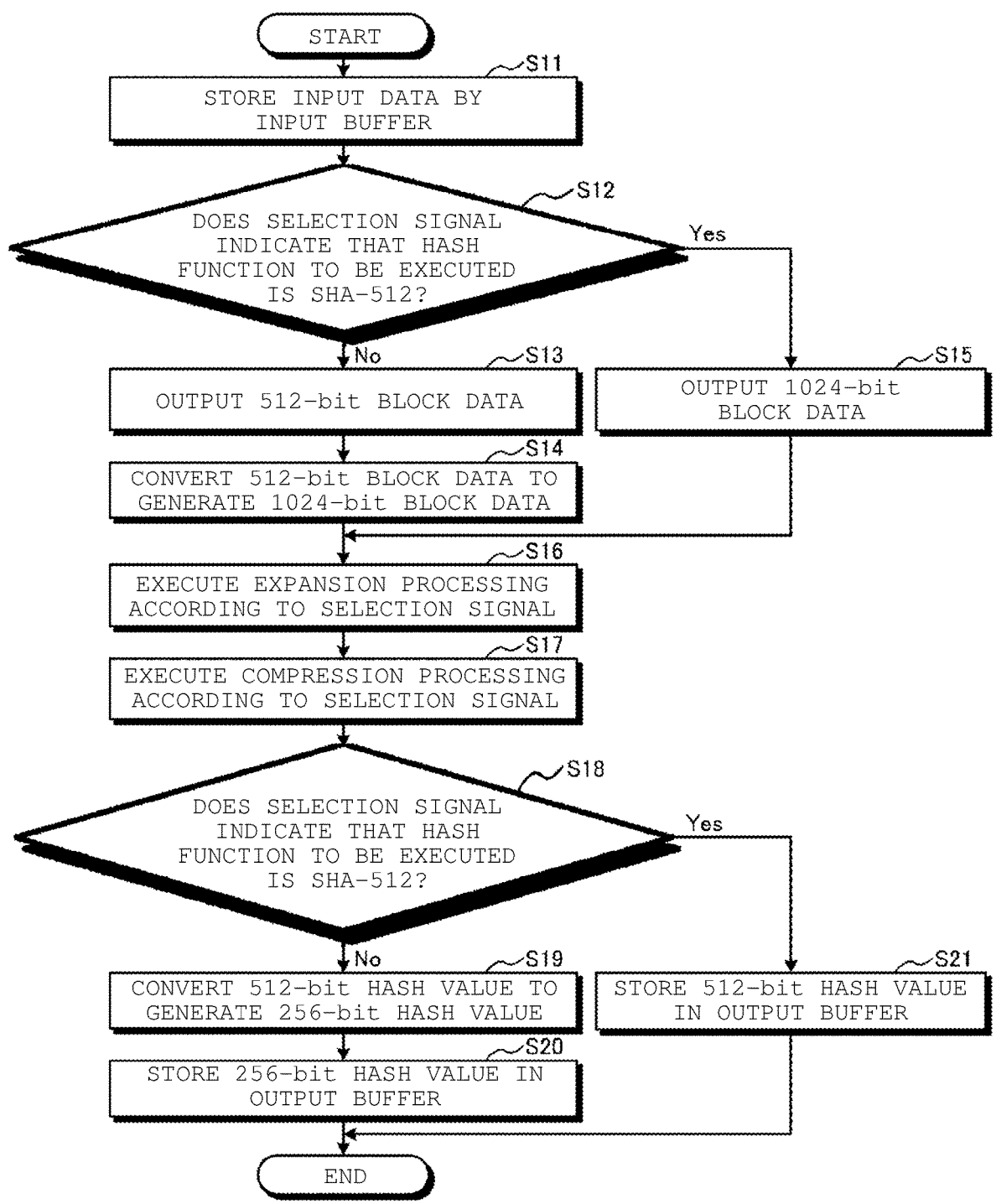
FIG. 11 is a flowchart of a hash value calculation processing procedure according to a first embodiment.

A hash value calculation processing procedure executed by the hash value calculation unit 32 will be described with reference to FIG. 11. FIG. 11 is a flowchart of the hash value calculation processing procedure according to the first embodiment. First, the input buffer 321 stores input data (step S11). Here, when the selection signal indicates that the hash function of SHA-512 is to be executed (Yes in step S12), block data of 1024 bits is output from the input buffer 321 to the expansion and compression circuit 324 (step S15).

When the selection signal does not indicate that the hash function of SHA-512 is to be executed (No in step S12), block data of 512 bits is output from the input buffer 321 to the conversion circuit 322 (step S13). Then, the conversion circuit 322 generates block data of 1024 bits and outputs the block data of 1024 bits to the expansion and compression circuit 324 (step S14).

The expansion and compression circuit 324 executes the expansion processing based on the selection signal (step S16), and executes the compression processing (step S17).

When the selection signal indicates that the hash function of SHA-512 is to be executed (Yes in step S18), a hash value of 512 bits is output to the output buffer 326 (step S21). In step S18, when the selection signal does not indicate that the hash function of SHA-512 is to be executed (No in step S18), the conversion circuit 325 generates converted data of 32-bit×8 (step S19) and outputs the converted data of 32-bit×8 to the output buffer 326 (step S20).

Explanation of Signature Generation Process

Figure 12:
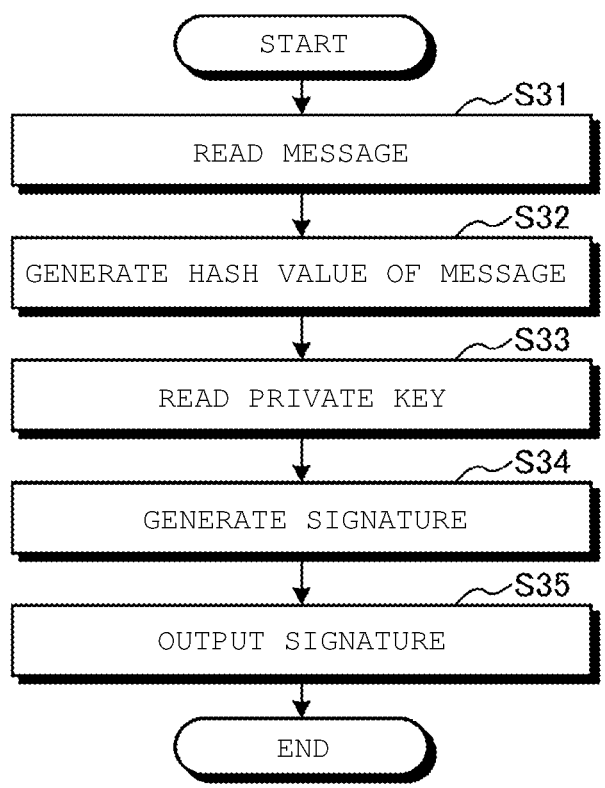
FIG. 12 is a flowchart of a signature generation processing procedure according to a first embodiment.

A procedure of the signature generation process will be described with reference to FIG. 12. FIG. 12 is a flowchart of the signature generation processing procedure according to the first embodiment.

First, the signature processing unit 31 reads a message from the storing unit 30 (step S31). The message refers to a signature processing target, for example, a computer program code.

The signature processing unit 31 inputs the message to the hash value calculation unit 32. The hash value calculation unit 32 outputs a hash value using the message as input data (step S32).

Subsequently, the signature processing unit 31 reads a private key from the storing unit 30 (step S33).

The signature processing unit 31 inputs the hash value and the private key into the public key encryption processing unit 33, and applies a known technique to generate signature data based on data output by the public key encryption processing unit 33 (step S34), and outputs the signature data to the storing unit 30 (step S35).

Explanation of Signature Verification

Figure 13:
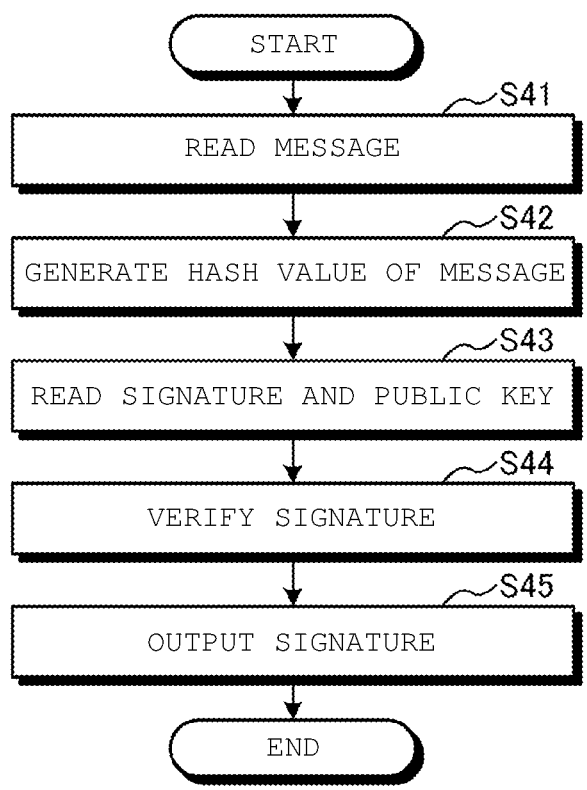
FIG. 13 is a flowchart of a signature verification processing procedure according to a first embodiment.

A procedure of signature verification will be described with reference to FIG. 13. FIG. 13 is a flowchart of a signature verification processing procedure according to the first embodiment.

First, the signature processing unit 31 reads a message from the storing unit 30 (step S41).

Subsequently, the signature processing unit 31 inputs the message to the hash value calculation unit 32. The hash value calculation unit 32 outputs a hash value using the message as input data (step S42).

The signature processing unit 31 then reads the signature data and the public key from the storing unit 30 (step S43).

The signature processing unit 31 then verifies the signature. For example, the signature processing unit 31 inputs the signature data and the public key into the public key encryption processing unit 33, and applies a known technique to verify the signature based on the data and the hash value output by the public key encryption processing unit 33 (step S44). The signature processing unit 31 outputs a result indicating whether the signatures match (step S45).

In the example embodiments described above, the hash value calculation unit 32 includes: (1) the conversion circuit 322 configured to convert input data according to the input data width of SHA-512 when executing the hash function of SHA-256, (2) the expansion and compression circuit 324 configured to select the logic function of SHA-256 and the logic function of SHA-512, (3) the conversion circuit 325 configured to convert the output value according to the output data width of SHA-256 when the output value output from the expansion and compression circuit 324 is obtained by the hash function of SHA-256.

In such a case, the hash value calculation unit 32 converts input data according to the input data width of SHA-512 when executing the hash function of SHA-256 and selects and processes the logic function of SHA-256 and the logic function of SHA-512 in the expansion and compression circuit 324. Thus, the register part and the addition operation unit in the expansion and compression circuit 324 can be shared, and as a result, the circuit area can be reduced.

Second Embodiment

The expansion and compression circuit 324 in the first embodiment has a register size of 64 bits. An expansion and compression circuit 324 in a second embodiment has two modules each having a register size of 32 bits. Here, an expansion processing circuit of the expansion and compression circuit 324 according to the second embodiment is illustrated in FIG. 14.

Figure 14:
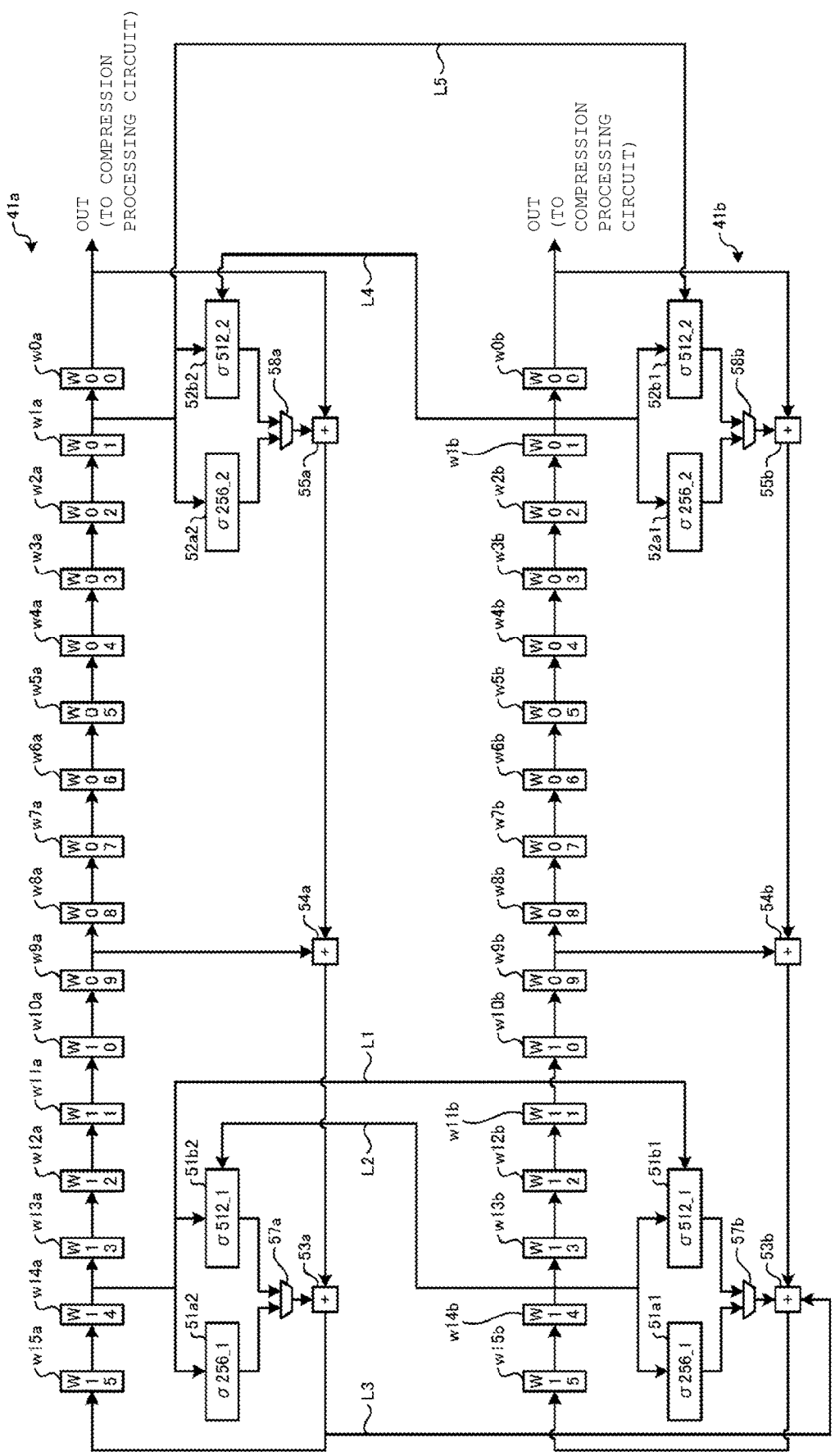
FIG. 14 is a diagram of an expansion processing circuit in an expansion and compression circuit according to a second embodiment.

As illustrated in FIG. 14, the expansion processing circuit includes an expansion processing circuit 41a and an expansion processing circuit 41b. That is, the expansion processing circuit according to the second embodiment includes two expansion processing circuits illustrated in FIG. 9. The expansion processing circuit 41a is a module for lower 32-bit data, and the expansion processing circuit 41b is a module for upper 32-bit data.

As illustrated in FIG. 14, the expansion and compression circuit 324 in the second embodiment includes an interface L1, an interface L2, an interface L4, and an interface L5 for sharing data between the lower 32-bit side and the upper 32-bit side. The expansion and compression circuit 324 in the second embodiment includes an interface L3 for transmitting an addition result. For example, each interface is one or more bus lines for connecting other components or an interface circuit including such bus lines.

Figure 15:
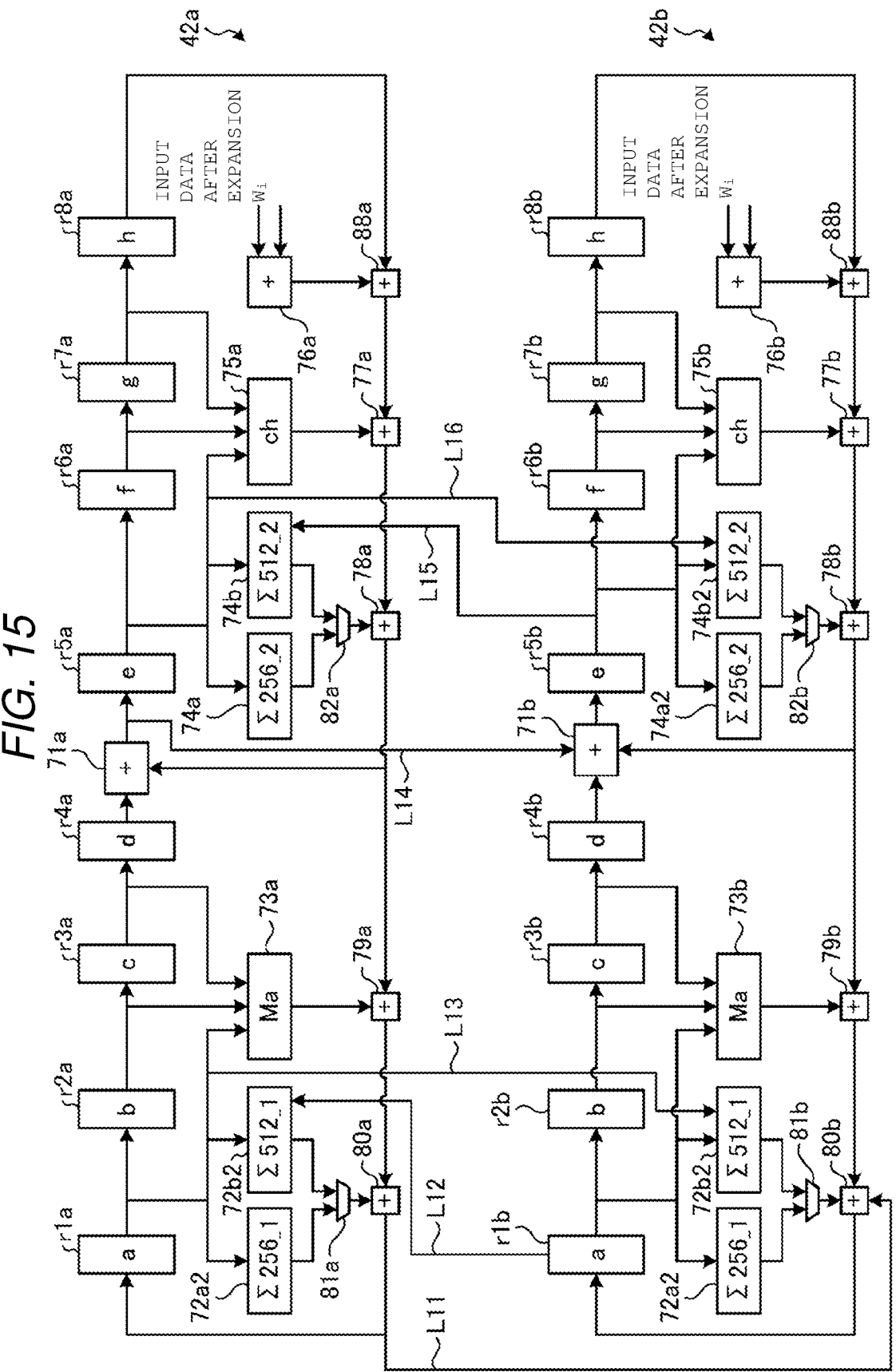
FIG. 15 is a diagram of a compression processing circuit in an expansion and compression circuit according to a second embodiment.

A compression processing circuit of the expansion and compression circuit 324 in the second embodiment is illustrated in FIG. 15. As illustrated in FIG. 15, the compression processing circuit includes a compression processing circuit 42a and a compression processing circuit 42b. That is, the compression processing circuit according to the second embodiment includes two compression processing circuits illustrated in FIG. 10. The compression processing circuit 42a is a module for lower 32-bit data, and the compression processing circuit 42b is a module for upper 32-bit data.

As illustrated in FIG. 15, the compression processing circuit in the second embodiment includes an interface L12, an interface L13, an interface L15, and an interface L16 for sharing data between the lower 32-bit side and the upper 32-bit side. The compression processing circuit in the second embodiment includes an interface L11 and an interface L14 for transmitting an addition result.

As described above, in the expansion and compression circuit 324 of the second embodiment, not only the hash function having the register size of 32 bits but also the hash function having a register size of 64 bits can be executed by including a plurality of circuits having the register size of 32 bits and including the interfaces for sharing information and transmitting the addition result.

The expansion and compression circuit 324 in the second embodiment may further include, as a selection signal, a signal indicating that the hash functions of SHA-256 are to be executed in parallel. As described above, the expansion and compression circuit 324 in the second embodiment includes a plurality of circuits for executing the hash function of 32 bits, and thus the hash functions of SHA-256 can be executed in parallel.

Third Embodiment

Figure 16:
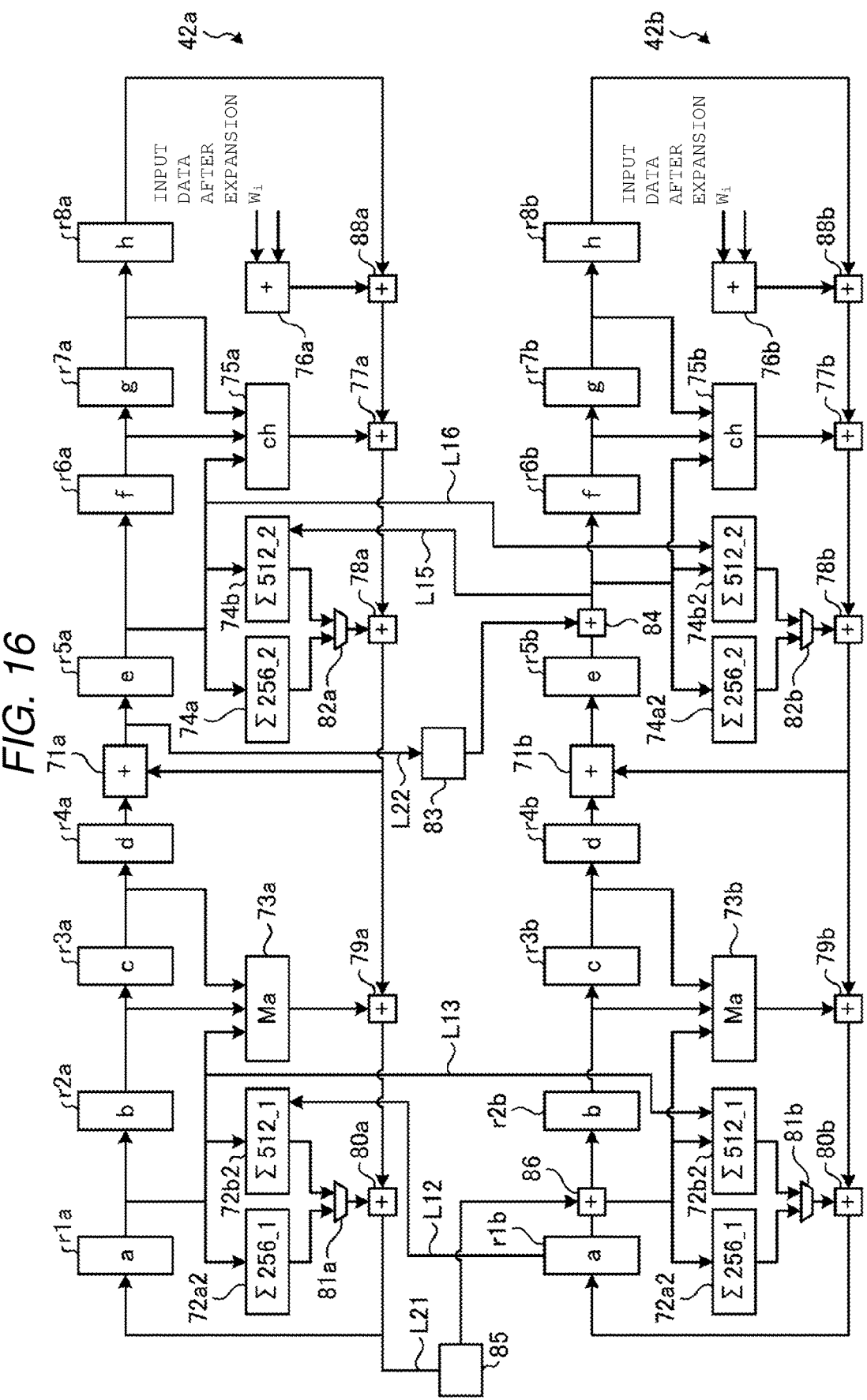
FIG. 16 is a diagram of a compression processing circuit in an expansion and compression circuit related to a third embodiment.

The compression processing circuit in the second embodiment includes the interface L11 and the interface L14 for transmitting the addition result. As illustrated in FIG. 16, a compression circuit according to a third embodiment includes an interface L21 including a storing mechanism 85 and an interface L22 including a storing mechanism 83. For example, the storing mechanisms 83 and 85 are flip-flop or latch circuits. The interface L21 and the interface L22 are connected to an addition operation unit 86 and an addition operation unit 84, respectively.

As described above, the interface L21 and the interface L22 transmit the addition result via the storing mechanism 85 and the storing mechanism 83, and thus the timing of transmitting the addition result can be delayed by one cycle, and the critical path can be shortened.

Fourth Embodiment

Figure 17:
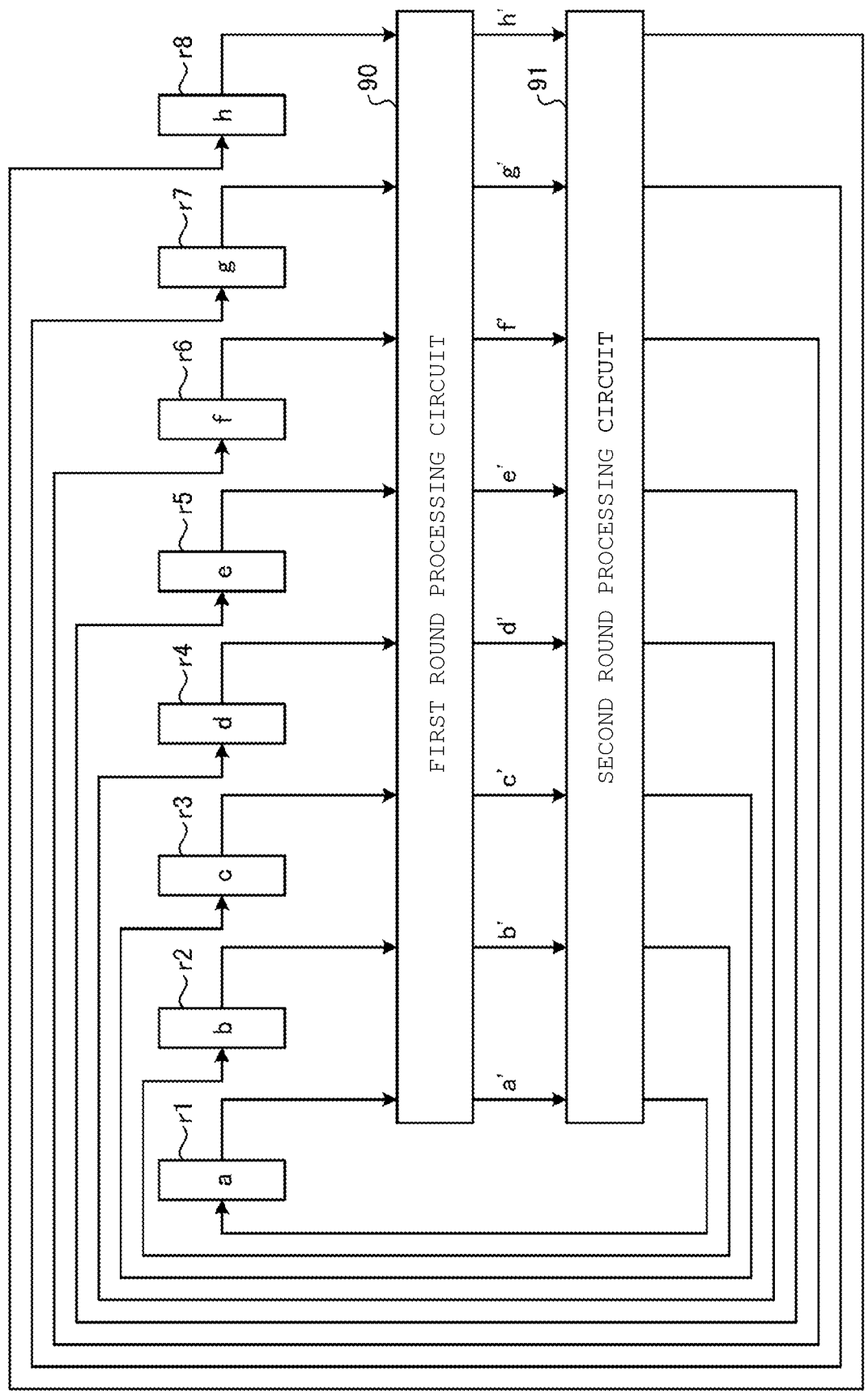
FIG. 17 is a diagram of a compression processing circuit according to a fourth embodiment.

In the compression processing circuit according to a fourth embodiment, a plurality of pieces of round processing are collectively executed. Here, the compression processing circuit according to the fourth embodiment is illustrated in FIG. 17. As illustrated in FIG. 17, the compression processing circuit includes registers r1 to register r8, a first round processing circuit 90, and a second round processing circuit 91.

Here, each of the first round processing circuit 90 and the second round processing circuit 91 includes the logic function operation unit 72a, the logic function operation unit 72b, the logic function operation unit 73, the logic function operation unit 74a, the logic function operation unit 74b, the logic function operation unit 75, the addition operation units 76 to 80, the selector 81, the selector 82, and the addition operation unit 88 illustrated in FIG. 10.

As described above, the compression processing circuit in the fourth embodiment includes the first round processing circuit 90 and the second round processing circuit 91, and thus the logical operations and additions for a plurality of rounds can be collectively executed and processing efficiency can be improved.

It is noted that the expansion processing circuit may also execute a plurality of pieces of round processing at once. For example, the expansion processing circuit may also include the registers w1 to w15 illustrated in FIG. 9, the first round processing circuit, and the second round processing circuit. With this configuration, the first round processing circuit and the second round processing circuit may include the logic function operation unit 51a, the logic function operation unit 51b, the logic function operation unit 52a, the logic function operation unit 52b, and the addition operation units 53 to 55, the selector 57, and the selector 58.

It is noted that, in the example embodiments described above, description has been made of a case where, in the circuit of the expansion processing part of the expansion compression circuit 324, only the logic function operation unit 51 and the logic function operation unit 52, whose processing are different in SHA-256 and SHA-512, include the logic function operation units of SHA-256 and SHA-512, respectively, by sharing the register part and the addition operation units. But the circuit of the expansion processing part of the expansion compression circuit 324 may be configured to simply connect the expansion circuit for SHA-256 or the expansion circuit for SHA-512 of the operation device according to the comparative example as illustrated in FIG. 4.

In the example embodiments described above, although the case where the hash value calculation unit 32 executes the hash function of SHA-256 and the hash function of SHA-512 has been described, the hash value calculation unit 32 in other examples may also or instead execute the hash function of SHA-256 and the hash function of SHA-384.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. An operation device for executing a first hash function and a second hash function having different input data widths, the operation device comprising:
    a first conversion circuit including an output terminal and configured to, upon receipt of a selection signal indicating the first hash function, convert input data according to the input data width of a second hash function, and output the converted input data through the output terminal, the input data width of the second hash function being larger than the input data width of the first hash function;
    a selector including a first input terminal connected to the output terminal of the first conversion circuit, a second input terminal to which the input data not converted by the first conversion circuit is input, and an output terminal, the selector being configured to:
        when the selection signal indicates the first hash function, select the input data converted by the first conversion circuit,
        when the selection signal indicates the second hash function, select the input data not converted by the first conversion circuit, and
        output the selected input data through the output terminal;
    a hash operation circuit including an input terminal connected to the output terminal of the selector and configured to perform, based on the selection signal, either the first hash function or the second hash function on the input data that is output through the output terminal of the selector and generate output data according to an output data width of the second hash function;
    a second conversion circuit configured to, when the selection signal indicates the first hash function, convert the output data according to an output data width of the first hash function that is smaller than the output data width of the second hash function; and
    an output buffer in which the output data converted by the second conversion circuit is stored when the selection signal indicates the first hash function and the output data generated by the hash operation circuit and not converted by the second conversion circuit is stored when the selection signal indicates the second hash function.

2. The operation device according to claim 1, wherein the hash operation circuit is configured to select a logic circuit to perform one of the first and second hash functions.

3. The operation device according to claim 1, wherein the hash operation circuit includes:
    an expansion processing circuit configured to expand the input data selected by the selector, and
    a compression processing circuit configured to compress the input data expanded by the expansion processing circuit.

4. The operation device according to claim 3, wherein the compression processing circuit includes a module configured to perform a 64-bit operation and the first and second hash functions in a selectable manner.

5. The operation device according to claim 3, wherein the compression processing circuit includes a plurality of processing circuits configured to perform a plurality of pieces of round processing for one of the first and second hash functions at once.

6. The operation device according to claim 3, wherein the expansion processing circuit includes a module configured to perform a 64-bit operation and perform the first and second hash functions in a selectable manner.

7. The operation device according to claim 1, wherein the first hash function is an SHA-256 function, and the second hash function is an SHA-512 function.

8. The operation device according to claim 1, wherein the first conversion circuit is configured to add dummy data to the input data.

9. The operation device according to claim 8, wherein when a size of the input data is 32-bit×16, a size of the input data to which the dummy data has been added is 64-bit×16.

10. The operation device according to claim 1, wherein the second conversion circuit is configured to convert a data width of the output data generated by the hash operation circuit into the output data width of the first hash function when the selection signal indicates the first hash function.

11. A memory system for executing a first hash function and a second hash function having different input data widths, the memory system comprising:
    a non-volatile memory;
    a first conversion circuit including an output terminal and configured to, upon receipt of a selection signal indicating the first hash function, convert input data according to the input data width of a second hash function, and output the converted input data through the output terminal, the input data width of the second hash function being larger than the input data width of the first hash function;
    a selector including a first input terminal connected to the output terminal of the first conversion circuit, a second input terminal to which the input data not converted by the first conversion circuit is input, and an output terminal, the selector being configured to:
        when the selection signal indicates the first hash function, select the input data converted by the first conversion circuit,
        when the selection signal indicates the second hash function, select the input data not converted by the first conversion circuit, and
        output the selected input data through the output terminal;
    a hash operation circuit including an input terminal connected to the output terminal of the selector and configured to perform, based on the selection signal, either the first hash function or the second hash function on the input data that is output through the output terminal of the selector and generate output data according to an output data width of the second hash function;

a second conversion circuit configured to, when the selection signal indicates the first hash function, convert the output data according to an output data width of the first hash function that is smaller than the output data width of the second hash function;

an output buffer in which the output data converted by the second conversion circuit is stored when the selection signal indicates the first hash function and the output data generated by the hash operation circuit and not converted by the second conversion circuit is stored when the selection signal indicates the second hash function; and a processor configured to generate signature data using the output data stored in the output buffer and store the signature data in the non-volatile memory.

12. An operation device for executing a first hash function and a second hash function having different input data widths, the operation device comprising:

a first conversion circuit configured to, upon receipt of a selection signal indicating the first hash function, add dummy data to input data to convert the input data according to the input data width of a second hash function, the input data width of the second hash function being larger than the input data width of the first hash function;

a selector configured to:
when the selection signal indicates the first hash function, select the input data to which the dummy data is added by the first conversion circuit, and
when the selection signal indicates the second hash function, select the input data to which the dummy data is not added by the first conversion circuit;

a hash operation circuit configured to perform, based on the selection signal, either the first hash function or the second hash function on the input data selected by the selector and generate output data according to an output data width of the second hash function;

a second conversion circuit configured to, when the selection signal indicates the first hash function, convert the output data according to an output data width of the first hash function that is smaller than the output data width of the second hash function; and an output buffer in which the output data converted by the second conversion circuit is stored when the selection signal indicates the first hash function and the output data generated by the hash operation circuit and not converted by the second conversion circuit is stored when the selection signal indicates the second hash function.

13. The operation device according to claim 12, wherein the hash operation circuit is configured to select a logic circuit to perform one of the first and second hash functions.

14. The operation device according to claim 12, wherein the hash operation circuit includes:

an expansion processing circuit configured to expand the input data selected by the selector, and a compression processing circuit configured to compress the input data expanded by the expansion processing circuit.

15. The operation device according to claim 14, wherein the compression processing circuit includes a module configured to perform a 64-bit operation and the first and second hash functions in a selectable manner.

16. The operation device according to claim 14, wherein the expansion processing circuit includes a module configured to perform a 64-bit operation and perform the first and second hash functions in a selectable manner.

17. The operation device according to claim 12, wherein the first hash function is an SHA-256 function, and the second hash function is an SHA-512 function.

18. The operation device according to claim 12, wherein when a size of the input data is 32-bit×16, a size of the input data to which the dummy data has been added is 64-bit×16.

\* \* \* \* \*